(12) United States Patent
Lacko et al.

(10) Patent No.: US 10,214,053 B2
(45) Date of Patent: Feb. 26, 2019

(54) PNEUMATIC VEHICLE TIRE

(71) Applicant: Continental Reifen Deutschland GmbH, Hannover (DE)

(72) Inventors: Michal Lacko, Puchov (SK); Matthias Gehlauf, Sehnde (DE); Fabian Wachmann, Hannover (DE)

(73) Assignee: Continental Reifen Deutschland GmbH, Hannover (DE)

( * ) Notice: Subject to any disclaimer, the term of this patent is extended or adjusted under 35 U.S.C. 154(b) by 0 days.

(21) Appl. No.: 15/186,864

(22) Filed: Jun. 20, 2016

(65) Prior Publication Data

US 2016/0297247 A1    Oct. 13, 2016

Related U.S. Application Data (63) Continuation of application No. PCT/EP2014/073410, filed on Oct. 31, 2014.

(30) Foreign Application Priority Data

Dec. 18, 2013   (DE) .................. 10 2013 226 443

(51) Int. Cl.
*B60C 9/20* (2006.01)
*B60C 9/22* (2006.01)
(Continued)

(52) U.S. Cl.
CPC .............. *B60C 9/20* (2013.01); *B60C 9/005* (2013.01); *B60C 9/0007* (2013.01); *B60C 9/02* (2013.01);
(Continued)

(58) Field of Classification Search
CPC ..... B60C 9/2006; B60C 2200/06; B60C 9/22; B60C 9/28; B60C 9/18; B60C 2009/2214;
(Continued)

(56) References Cited

U.S. PATENT DOCUMENTS

| 3,730,246 A | * | 5/1973 | Sidles | .................... B29D 30/22 |
| | | | | 152/527 |
| 3,757,843 A | * | 9/1973 | Carr | ...................... B60C 9/2009 |
| | | | | 152/527 |

(Continued)

FOREIGN PATENT DOCUMENTS

| DE | 10 2010 016 550 A1 | 10/2011 | | |
| WO | WO2011/131419 | * | 4/2010 | ............... B60C 9/22 |

OTHER PUBLICATIONS

Becker WO2011/131419 machine translation as provided by http://www.google.com.pg/patents/WO2011131419A1?cl=en on Nov. 7, 2017 (Year: 2011).*

(Continued)

*Primary Examiner* — Jodi C Franklin
(74) *Attorney, Agent, or Firm* — Walter Ottesen, P.A.

(57) ABSTRACT

The invention is directed to a pneumatic vehicle tire having a carcass and a belt built up on the radial outside of the carcass. The tire includes a profiled tread which is built up on the belt on the radial outside of the belt. The belt is formed from at least four belt plies which are arranged one on top of the other from the radial inside to the radial outside. The first belt ply and the second belt ply are crossing working plies. The reinforcing elements of the first and second belt plies are arranged at an angle of 10° to 45° to the circumferential direction. The reinforcing elements of the fourth belt ply are arranged at an angle of 40° to 75° to the circumferential direction and the reinforcing elements of the third belt ply are arranged at an angle of 0° to 5° to the circumferential direction.

14 Claims, 4 Drawing Sheets

(51) Int. Cl.
*B60C 11/00* (2006.01)
*B60C 9/00* (2006.01)
*B60C 9/02* (2006.01)

(52) U.S. Cl.
CPC .......... *B60C 9/2006* (2013.01); *B60C 9/2009* (2013.01); *B60C 9/22* (2013.01); *B60C 11/00* (2013.01); *B60C 2009/0071* (2013.01); *B60C 2009/2012* (2013.01); *B60C 2009/2016* (2013.01); *B60C 2009/2019* (2013.01); *B60C 2009/2022* (2013.01); *B60C 2009/2074* (2013.01); *B60C 2009/2214* (2013.01); *B60C 2009/2252* (2013.01); *B60C 2200/06* (2013.01)

(58) Field of Classification Search
CPC .......... B60C 9/0007; B60C 2009/1842; B60C 2009/2012; B60C 2009/2074; B60C 2009/208; B60C 2009/2219; B60C 2009/0215; B60C 2009/2016; B60C 2009/2019; B60C 2009/2022; B60C 2009/2223; B60C 2009/2261
See application file for complete search history.

(56) References Cited

U.S. PATENT DOCUMENTS

| | | | | |
|---|---|---|---|---|
| 4,308,083 | A * | 12/1981 | Toth, Jr. | B29D 30/08 152/209.6 |
| 4,474,633 | A * | 10/1984 | Watts | B29D 30/0645 152/526 |
| 4,498,514 | A * | 2/1985 | Maathuis | B60C 9/22 152/527 |
| 5,164,028 | A * | 11/1992 | Uemura | B60C 9/18 152/527 |
| 6,082,425 | A * | 7/2000 | Colom | B60C 9/2006 152/454 |
| 6,131,632 | A * | 10/2000 | Fukumoto | B60C 9/18 152/454 |
| 6,619,357 | B1 * | 9/2003 | Gillard | B60C 9/0007 152/531 |
| 9,315,074 | B2 * | 4/2016 | Bederna | B60C 9/2006 |
| 2004/0089391 | A1 * | 5/2004 | Jallais | B60C 9/09 152/527 |
| 2005/0173042 | A1 * | 8/2005 | Palgen | B60C 9/2006 152/534 |
| 2006/0169381 | A1 * | 8/2006 | Radulescu | B60C 9/2006 152/531 |
| 2007/0131331 | A1 * | 6/2007 | Neubauer | B60C 9/0007 152/527 |
| 2007/0169870 | A1 * | 7/2007 | Manno | B60C 9/2006 152/531 |
| 2008/0295934 | A1 * | 12/2008 | Mafune | B60C 19/08 152/152.1 |
| 2009/0277557 | A1 * | 11/2009 | Suzuki | B60C 9/2006 152/532 |
| 2010/0300597 | A1 * | 12/2010 | Yamazaki | B60C 9/2006 152/527 |
| 2011/0253279 | A1 * | 10/2011 | Daghini | B60C 9/0007 152/526 |
| 2012/0060995 | A1 * | 3/2012 | Maruoka | B60C 9/28 152/527 |
| 2012/0211140 | A1 * | 8/2012 | Johnson | B60C 15/0027 152/539 |
| 2013/0042954 | A1 * | 2/2013 | Becker | B60C 9/2006 152/535 |
| 2013/0240109 | A1 * | 9/2013 | Kato | B60C 15/0072 152/553 |
| 2013/0327467 | A1 * | 12/2013 | Becker | B29D 30/22 156/124 |
| 2014/0008001 | A1 * | 1/2014 | Becker | B60C 9/2006 152/527 |
| 2014/0261952 | A1 * | 9/2014 | Tanaka | B60C 9/2009 152/535 |

OTHER PUBLICATIONS

International Search Report dated Jan. 27, 2015 of international application PCT/EP2014/073410 on which this application is based.

* cited by examiner

PNEUMATIC VEHICLE TIRE

CROSS REFERENCE TO RELATED APPLICATIONS

This application is a continuation application of international patent application PCT/EP2014/073410, filed Oct. 31, 2014, designating the United States and claiming priority from German application 10 2013 226 443.7, filed Dec. 18, 2013, and the entire content of both applications is incorporated herein by reference.

FIELD OF THE INVENTION

The invention relates to a pneumatic vehicle tire for utility vehicles, having a carcass, having a belt which is constructed radially outside the carcass and having a profiled tread which is constructed on the belt radially outside the belt, wherein the belt is formed from at least four belt plies arranged lying one on top of the other from the radial inside to the radial outside, wherein the first belt ply, which is arranged furthest to the inside in the radial direction R, is formed with parallel reinforcement members embedded in rubber, the second belt ply, arranged on the first belt ply, is formed with parallel reinforcement members embedded in rubber, the third belt ply, arranged on the second belt ply, is formed with parallel reinforcement members embedded in rubber, and the fourth belt ply, arranged on the third belt ply, is formed with parallel reinforcement members embedded in rubber.

BACKGROUND OF THE INVENTION

Conventional pneumatic tires for utility vehicles usually have a four-ply belt with a so-called triangular configuration in which two working plies are arranged one on top of the other in a radial direction, the steel cords of which are each at an angle of approximately 15° to 30° with respect to the circumferential direction, wherein the steel cords of one working ply and those of the second working ply are inclined in different axial directions A. The working plies thereby form a cross-braced structure. In such belts there is usually a belt ply embodied as a barrier ply which is located under the working plies, the steel cords of which barrier ply are at an angle of 45° to 65° with respect to the circumferential direction, as a result of which the cords of the working plies and of the barrier ply form a triangular structure. In addition, an additional protective ply which forms the fourth belt ply is usually formed above the two working plies, the steel cords of which protective ply are also at an angle of approximately 15° to 30° with respect to the circumferential direction of the vehicle tire. Such belts have a limited circumferential stiffness. The mobility of the belt edges made possible in this way can have an adverse effect on the durability of the tire. The belt may also be subject to radial expansion during operation. This growth can lead to excessive uneven wear of the tire.

It is also known to form pneumatic tires for utility vehicles with a four-ply arrangement with a radially inner barrier ply with steel cords which enclose an angle of approximately 45° to 65° with respect to the circumferential direction, with two working plies which are formed over the barrier ply and which, in a conventional way, form a cross-braced structure of their steel cords with an orientation of the steel cords of in each case approximately 15° to 30°, and with a fourth belt ply which is formed radially outside the two working plies on the outer working ply and which is embodied as a so-called 0°-ply, wherein the reinforcement members thereof composed of steel cords are oriented substantially in the circumferential direction with an angle of 0° to 2.5° with respect to the circumferential direction. In such embodiments, the circumferential stiffness of the belt is increased, which has a positive effect on the durability of the belt. However, the influence of the 0°-ply is limited substantially to the radially outer working ply. However, the inner working ply is formed with residual mobility, still with adverse effects on the durability and wear.

Furthermore, occasionally—for example in U.S. Pat. No. 9,315,074—an embodiment of a pneumatic tire for a utility vehicle having a four-ply belt arrangement has been proposed, with a radially inner barrier ply with steel cords which enclose an angle of 50° with respect to the circumferential direction. Two working plies are formed radially outside the barrier ply. A 0°-ply is formed radially between the two working plies. In these embodiments, the two working plies are again formed in a cross-braced structure, and the steel cords thereof are oriented at angles of in each case 20° with respect to the circumferential direction. Such embodiments make it possible to realize a high circumferential strength and, in relation to a conventional pneumatic tire for utility vehicles, improved durability and an improved wear pattern. Nevertheless, even in the case of such embodiments of tires for utility vehicles, in the case of intense pressure loading in the center of the footprint and relatively considerably reduced pressure in the shoulder region, undesirably intensely pronounced uneven wear can still occur.

SUMMARY OF THE INVENTION

It is an object of the invention to provide a pneumatic vehicle tire for utility vehicles having at least four belt plies, in which, in a simple manner, and utilizing the advantages of the embodiment of a four-ply belt with two working plies, a zero ply and a barrier ply, it is made possible to achieve further reduced and homogenized wear.

According to an embodiment, a pneumatic vehicle tire for utility vehicles has a carcass, having a belt which is constructed radially outside the carcass and having a profiled tread which is constructed on the belt radially outside the belt, wherein the belt is formed from at least four belt plies arranged lying one on top of the other from the radial inside to the radial outside, wherein the first belt ply, which is arranged furthest to the inside in the radial direction R, is formed with parallel reinforcement members embedded in rubber, the second belt ply, arranged on the first belt ply, is formed with parallel reinforcement members embedded in rubber, the third belt ply, arranged on the second belt ply, is formed with parallel reinforcement members embedded in rubber, and the fourth belt ply, arranged on the third belt ply, is formed with parallel reinforcement members embedded in rubber. The first belt ply and the second belt ply are working plies, in which the reinforcement members of the first belt ply enclose, in terms of their orientation, an angle $\alpha$ with the circumferential direction U, where $10°\leq\alpha\leq45°$, and the reinforcement members of the second belt ply each enclose, in terms of their orientation, an angle $\gamma$ with the circumferential direction U, where $10°\leq\gamma\leq45°$, wherein, as viewed in the circumferential direction U of the vehicle tire, the reinforcement members of the first belt ply have an opposite axial direction of inclination in relation to the reinforcement members of the second belt ply, and wherein the reinforcement members of the fourth belt ply enclose, in terms of their orientation, an angle $\varepsilon$ with the circumferential direction U, where $40°\leq\varepsilon\leq75°$, and the reinforcement members of the third belt ply enclose, in terms of their orientation, an angle β with the circumferential direction U, where 0°≤β≤5°.

The embodiment makes it possible to maintain the embodiment with two working plies, a 0°-ply and a radially inner barrier ply, which is advantageous with regard to good force transmission in the circumferential and lateral directions and with regard to low wear. It has furthermore been found that, by way of the arrangement according to the invention of the belt plies, the wear can be further homogenized and reduced across the belt width.

The embodiment makes it possible to maintain the embodiment with two working plies, a 0°-ply and a radially inner barrier ply, which is advantageous with regard to force transmission in the circumferential and lateral directions and with regard to low wear. It has furthermore been found that the arrangement of the belt plies further homogenizes the wear across the belt width and can be reduced.

An embodiment of a pneumatic vehicle tire, wherein the first belt ply is formed so as to be larger in terms of its axial extent in the pneumatic vehicle tire than all of the other belt plies of the belt, is particularly advantageous. This permits decoupling of the belt plies, whereby the durability of the tire can be further improved.

An embodiment of a pneumatic vehicle tire, wherein the third belt ply is formed so as to be smaller in terms of its axial extent in the pneumatic vehicle tire than the first belt ply and than the second belt ply of the belt, is particularly advantageous. This permits a uniform increase in strength from belt edge to belt center, further promoting good wear and long structural durability.

An embodiment of a pneumatic vehicle tire is particularly advantageous, wherein, radially outside the fourth belt ply and on the fourth belt ply, there is arranged a fifth belt ply with parallel reinforcement members embedded in rubber, which reinforcement members, in terms of their orientation, enclose an angle δ with the circumferential direction U of the pneumatic vehicle tire, where 40°≤δ≤75°—in particular where δ=50°—and wherein, as viewed in the circumferential direction U of the vehicle tire, the reinforcement members of the fifth belt ply have an opposite axial direction of inclination relative to the reinforcement members of the fourth belt ply. The cross-ply arrangement realized in this way yields additional stiffness and permits a more uniform transmission of force in the fourth and fifth belt plies.

An embodiment of a pneumatic vehicle tire, wherein the fourth and fifth belt plies are formed so as to be smaller in terms of their axial extent in the pneumatic vehicle tire than the first and second belt plies, is particularly advantageous. In this way, the stiffness in the shoulder regions of the belt can be optimized in order to achieve a particularly expedient wear pattern.

An embodiment of a pneumatic vehicle tire, wherein the reinforcement members of the first belt ply and the reinforcement members of the second belt ply are steel cords, is particularly advantageous.

An embodiment of a pneumatic vehicle tire, wherein the reinforcement members of the two working plies in the tire are configured to be extensible, with an elongation D of D≥0.2% at 10% of the breaking force is particularly advantageous. In this way, by way of flexibility of the belt pack, the durability of the tire can be further promoted.

An embodiment of a pneumatic vehicle tire, wherein the reinforcement members of the third belt ply are reinforcement members composed of steel is particularly advantageous. In this way, a high level of circumferential stiffness and good durability and more uniform wear are further promoted. Furthermore, controlled tire growth is promoted.

An embodiment of a pneumatic vehicle tire, wherein the reinforcement members of the third belt ply are steel cords which, at 10% of the breaking force, exhibit an elongation D of D≥0.2%—in particular of D≥1% is particularly advantageous. In this way, the elevation of the belt in the construction process can be made possible in a simple manner.

An embodiment of a pneumatic vehicle tire, wherein the reinforcement members of the fourth belt ply are steel cords is particularly advantageous.

An embodiment of a pneumatic vehicle tire, wherein the reinforcement members of the fifth belt ply are steel cords is particularly advantageous.

An embodiment of a pneumatic vehicle tire, wherein, as viewed in the circumferential direction U, the reinforcement members of the first belt ply and the reinforcement members of the fourth belt ply have the same axial direction of inclination is particularly advantageous. An improved wear pattern can be made possible in this way.

An embodiment of a pneumatic vehicle tire, wherein, as viewed in the circumferential direction U, the reinforcement members of the second belt ply and the reinforcement members of the fourth belt ply have the same axial direction of inclination is particularly advantageous. This promotes a particularly stiff construction of the belt.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
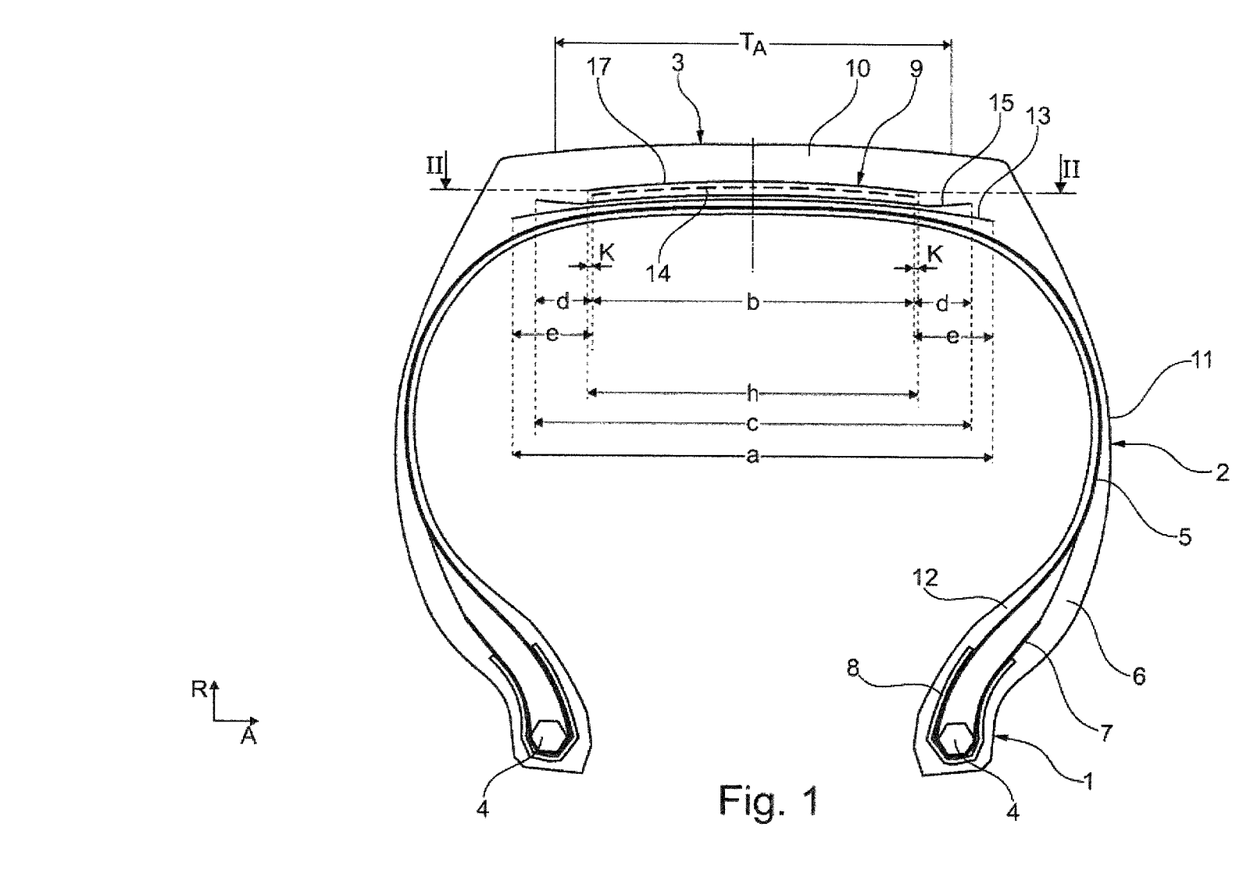
FIG. 1 shows a cross section of a pneumatic vehicle tire of radial type of construction for utility vehicles.
Figure 2:
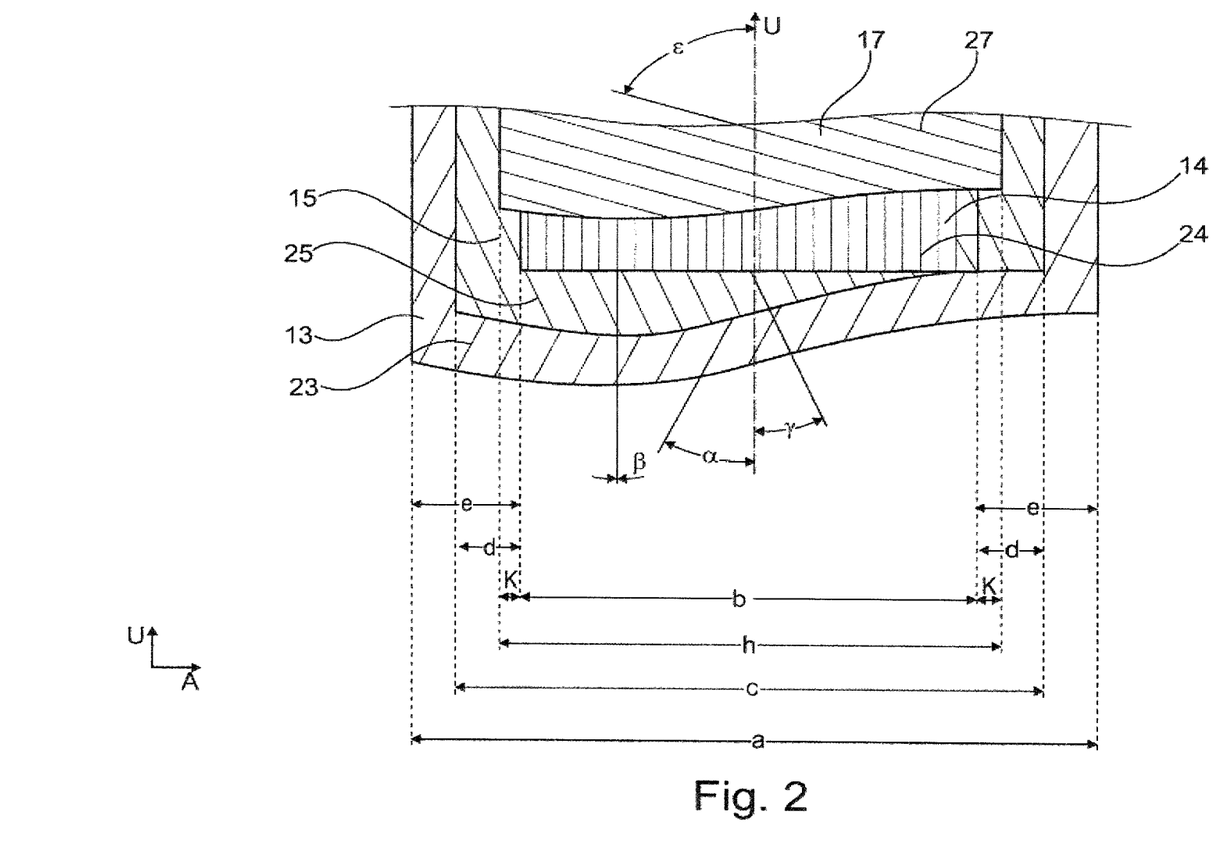
FIG. 2 shows a plan view of the belt from FIG. 1 as per the section II-II in FIG. 1, wherein for simplicity, all of the other components of the tire have not been illustrated.

FIG. 1 and FIG. 2 show a pneumatic tire of radial type of construction for utility vehicles, having two side walls 2 which extend in the radial direction R of the vehicle tire and having a crown region 3 which is formed axially between the side walls. The side walls are each formed with a bead region 1 on their extent end pointing inward in the radial direction. A bead core 4 of known type is formed in the bead region. The bead core 4 has high tensile strength in the circumferential direction U and extends over the circumference of the tire in the circumferential direction. The bead cores 4 are, in a known manner, formed in a wound manner from wire which extends in the circumferential direction U of the pneumatic vehicle tire and which is embedded in rubber. In the conventional manner, an apex (bead filler) 6 which is triangular in cross section is formed from a hard rubber material on the bead cores 4. The pneumatic vehicle tire is formed with a carcass 5 which, starting from the bead core 4 formed in the left-hand bead region 1 of the pneumatic vehicle tire, extends outward in the radial direction R of the pneumatic vehicle tire through the left-hand side wall 2 as far as the crown region 3, and in the crown region 3 extends in the axial direction A of the pneumatic vehicle tire to the right-hand side wall 2, and in the right-hand side wall 2 of the pneumatic vehicle tire extends radially inward as far as the bead core 4 formed in the bead region 1 of the right-hand side wall 2. The carcass is, in both bead regions 1, formed so as to extend radially outward in each case along the axial inner side of the bead core 4 to the radial inner side of the respective bead core 4, then as an extension in the axial direction A along the radial inner side of the bead core 4 to the axial outer side of the bead core 4, and then as an extension on the axial outer side of the bead core 4, so as to constitute a turned-over part 7. The carcass 5 extends with its turned-over part 7 along the axial outer side of the apex 6 and ends on the axial outer side of the apex 6. The carcass 5 is formed, in a way which is known but not illustrated in more detail, from a carcass ply which extends in the circumferential direction U over the entire circumference of the pneumatic vehicle tire and which has parallel cords—for example steel cords—which are embedded in rubber and extend substantially in the radial direction R in the region of the side walls 2 and substantially in the axial direction A in the crown region. An inner layer 12 composed of known, particularly air-impermeable rubber material extends from the left-hand bead region 1 as far as the right-hand bead region 1 on that side of the carcass 5 which faces toward the inside of the tire. An additional bead reinforcing strip 8, which extends over the entire circumference of the pneumatic vehicle tire, is formed in each bead region 1 on that side of the carcass 5 which faces away from the bead core 4. The bead reinforcing strip 8 is, for example, a material strip which is embedded in rubber and composed of parallel reinforcement members of a textile or metallic configuration.

In the region of the tire crown 3, a belt 9, which extends over the entire circumference of the pneumatic vehicle tire in the circumferential direction U and in the axial direction A from the left-hand tire shoulder as far as the right-hand tire shoulder, is formed on the carcass 5, outside the carcass 5 in the radial direction R of the pneumatic vehicle tire, which belt 9 is formed from four belt plies 13, 15, 14 and 17 which are arranged one above the other and so as to lie one on top of the other in the radial direction R from the inside to the outside. A profiled tread 10 of a known configuration, which extends over the entire circumference of the pneumatic vehicle tire in the circumferential direction U and in the axial direction A from the left-hand tire shoulder as far as the right-hand tire shoulder and which completely covers the belt 9, is formed on the belt 9 radially outside the belt 9. In the region of the tire side walls 2, a side wall rubber strip 11, which extends in the radial direction R from the bead region 1 as far as the profiled tread 10 in the crown region 3, is formed in a known manner on that side of the carcass 5 which faces away axially from the tire.

That belt ply 13 of the belt which is arranged furthest to the inside in the radial direction R forms the first belt ply 13. That belt ply 15, which is arranged on the first belt ply 13 outside the first belt ply 13 in the radial direction R, forms the second belt ply 15. That belt ply 14, which is arranged on the second belt ply 15, outside the second belt ply 15 in the radial direction R, forms the third belt ply 14. That belt ply 17, which is arranged on the third belt ply 14, outside the third belt ply 14 in the radial direction R, forms the fourth belt ply 17.

The belt ply 13 and the belt ply 15 are embodied as working plies of the tire and extend in each case in the circumferential direction U over the entire circumference of the pneumatic vehicle tire and, in contact with one another, in the axial direction A from the left-hand tire shoulder as far as the right-hand tire shoulder. The working ply 13 is formed from a ply of filiform parallel reinforcement members 23 which are embedded in rubber and which extend substantially rectilinearly over the entire width (a), measured in the axial direction A, of the belt ply 13 and which enclose an angle of inclination α with respect to the circumferential direction U, where 10°≤α≤45°. The working ply 15 is formed from a ply of filiform parallel reinforcement members 25 which are embedded in rubber and which extend substantially rectilinearly over the entire axial width (c) of the belt ply 15 and which enclose an angle of inclination γ with respect to the circumferential direction U, where 10°≤γ≤45°. The direction of inclination of the reinforcement members 25 of the working plies 15 as viewed along the circumferential direction U is oriented in the opposite axial direction A in relation to the direction of inclination of the reinforcement members 23 of the working ply 13.

The third belt ply 14, which is formed between the fourth belt ply 17 and the second belt ply (upper working ply) 15 in the radial direction R, extends in the circumferential direction U over the entire circumference of the pneumatic vehicle tire and in the axial direction A from the left-hand tire shoulder to the right-hand tire shoulder, and is embodied as a 0°-ply. For this purpose, the belt ply 14 is formed from parallel filiform reinforcement members which are embedded in rubber and which extend linearly over the entire circumference of the pneumatic vehicle tire so as to enclose an angle β, where 0°≤β≤45°, with respect to the circumferential direction U and which are therefore oriented substantially in the circumferential direction U of the pneumatic vehicle tire.

All four belt plies 13, 15, 14 and 17 extend to both axial sides, in each case as far as a position in the corresponding tire shoulder. The belt ply 14 is, at least over a part of its axial extent, in direct contact with the second belt ply (upper working ply) 15 arranged therebeneath.

The third belt ply (0°-ply) 14 extends in the axial direction A over an axial width (b), the first belt ply (lower working ply) 13 extends in the axial direction A over an axial width (a), and the second belt ply (upper working ply) 15 extends in the axial direction A over an axial width (c) in the tire, where a>c>b. In this context, the first belt ply 13 extends to both axial sides of the third belt ply 14 by an axial extent length (e) beyond the axial position of the respective belt edge of the second belt ply 14. Likewise, the second belt ply 15 extends in both axial directions in each case by an axial extent length (d) beyond the axial position of the respective belt edge of the third belt ply 14. For the extent lengths (e) and (d) of this projecting length, the following applies: e>d. Here, the dimension (d) is configured to be d≥10 mm. In the embodiment, the dimension (e) is configured to be e≤60 mm.

The fourth belt ply 17, arranged on the third belt ply 14, extends in the circumferential direction U over the entire circumference of the pneumatic vehicle tire and in the axial direction A of the pneumatic vehicle tire from the left-hand tire shoulder to the right-hand tire shoulder. The belt ply 17 is formed from a ply of filiform parallel reinforcement members 27 which are embedded in rubber and which extend substantially rectilinearly over the entire axial width (h) of the belt ply 17 and which enclose an angle of inclination ε with respect to the circumferential direction U, where 40°≤ε≤75°, for example where ε=50°.

The reinforcement members 27 of the fourth belt ply 17 are—as illustrated in FIG. 2—oriented with the same axial direction of inclination, as viewed along the extent in the circumferential direction U of the tire, as the reinforcement members 25 of the second belt ply (upper working ply) 15, and thus with an opposite axial direction of inclination in relation to the reinforcement members 23 of the first belt ply (lower working ply) 13.

In another embodiment which is not illustrated, the reinforcement members 27 of the fourth belt ply 17 are oriented with the same axial direction of inclination, as viewed along the extent in the circumferential direction U of the tire, as the reinforcement members 23 of the first belt ply (lower working ply) 13, and thus with an opposite axial direction of inclination in relation to the reinforcement members 25 of the second belt ply (upper working ply) 15.

The belt ply 17 extends over the entire axial extent of the third belt ply 14 in direct contact with the third belt ply 14, and ends in the axial direction A with its two belt ply edges in each case at an axial position between the axial position of the closest belt ply edge of the third belt ply 14 and the axial position of the closest belt ply edge of the second belt ply (radially outer working ply) 15, at an axial distance (k) from the belt ply edge of the third belt ply 14, where k<d<e. The width (h) is the dimension of the axial extent of the fourth belt ply 17, where b<h<c<a.

The reinforcement members 27 are steel cords of known type, for example of "1+5" type, "3+6" type, "3+8" type or "3+9" type.

The reinforcement members 23 and 25 of the two working plies 13 and 15 are extensible steel cords of known type which, under tensile load, exhibit a breaking force F of F>2500N and, at 10% of the breaking force, an elongation D of D 0.2%—for example where 0.28%≤D≤0.32%. The elongation D of the reinforcement members is in this case the elongation determined, in the case of the vulcanized tire, on the reinforcement member extracted from the ply. The measurement of the elongation is performed on reinforcement members which have been removed over their full length from the complete vulcanized tire. For the measurement, the reinforcement member has rubber residues removed from it such that the reinforcement member with the amount of rubber remaining thereon has a diameter no greater than 1.5 times the maximum outer diameter of the non-rubberized reinforcement member. The determination of the elongation is performed in accordance with ASTM D 2969-04.

The reinforcement members 23 and 25 are for example steel cords of "3+8×0.35HT" type, with a breaking force F of approximately 3000 N and with an elongation D of D>0.2% at 10% of the breaking force.

In one embodiment, the reinforcement members 24 are steel cords of known type. In another embodiment, the reinforcement members 24 are steel cords which, at 10% of the breaking force, exhibit an elongation D of D≥0.2%—for example of D=0.5%. In one embodiment, the reinforcement members 24 are steel cords which, at 10% of the breaking force, exhibit an elongation D of D≥1%—for example of D=1.3%.

The reinforcement members 24 are for example steel cords of "3×7 HENT" type.

In one embodiment, the following values are selected: $\beta=3°$, $\alpha=18°$, $\gamma=18°$, $\varepsilon=50°$, d=11 mm, k=8 mm and e=15 mm.

In an alternative embodiment (not illustrated) in relation to the above embodiments, the angle of inclination $\alpha$ of the reinforcement members 23 of the inner working ply 13 is in each case greater than the angle of inclination $\gamma$ of the reinforcement members 25 of the outer working ply 15.

In an alternative embodiment (not illustrated) in relation to the above embodiments, the angle of inclination $\alpha$ of the reinforcement members 23 of the inner working ply 13 is in each case smaller than the angle of inclination $\gamma$ of the reinforcement members 25 of the outer working ply 15.

Figure 3:
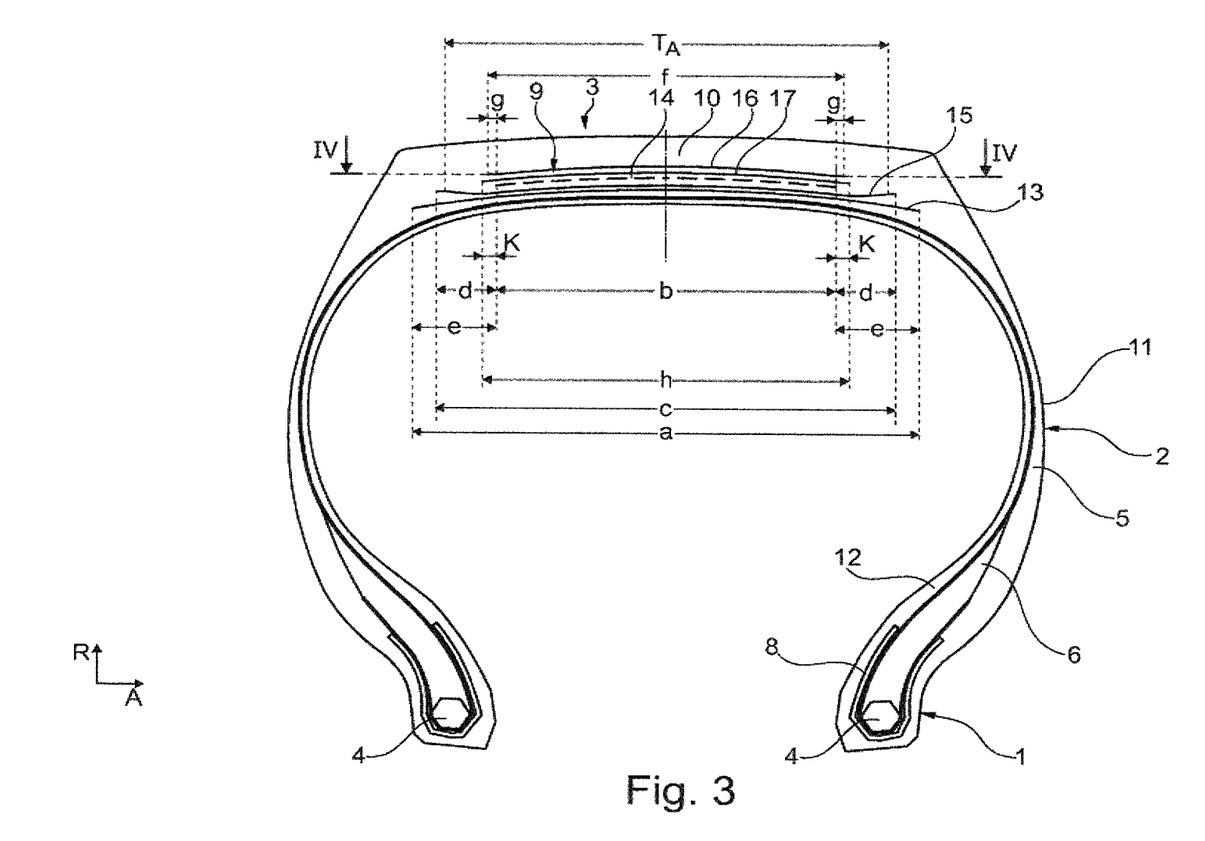
FIG. 3 shows a cross section of a pneumatic vehicle tire analogous to the illustration of FIG. 1, with an alternative belt embodiment; and, FIG. 4 shows a plan view of the belt from FIG. 3 as per the section IV-IV in FIG. 3, wherein for simplicity, all of the other components of the tire have not been illustrated.
Figure 4:
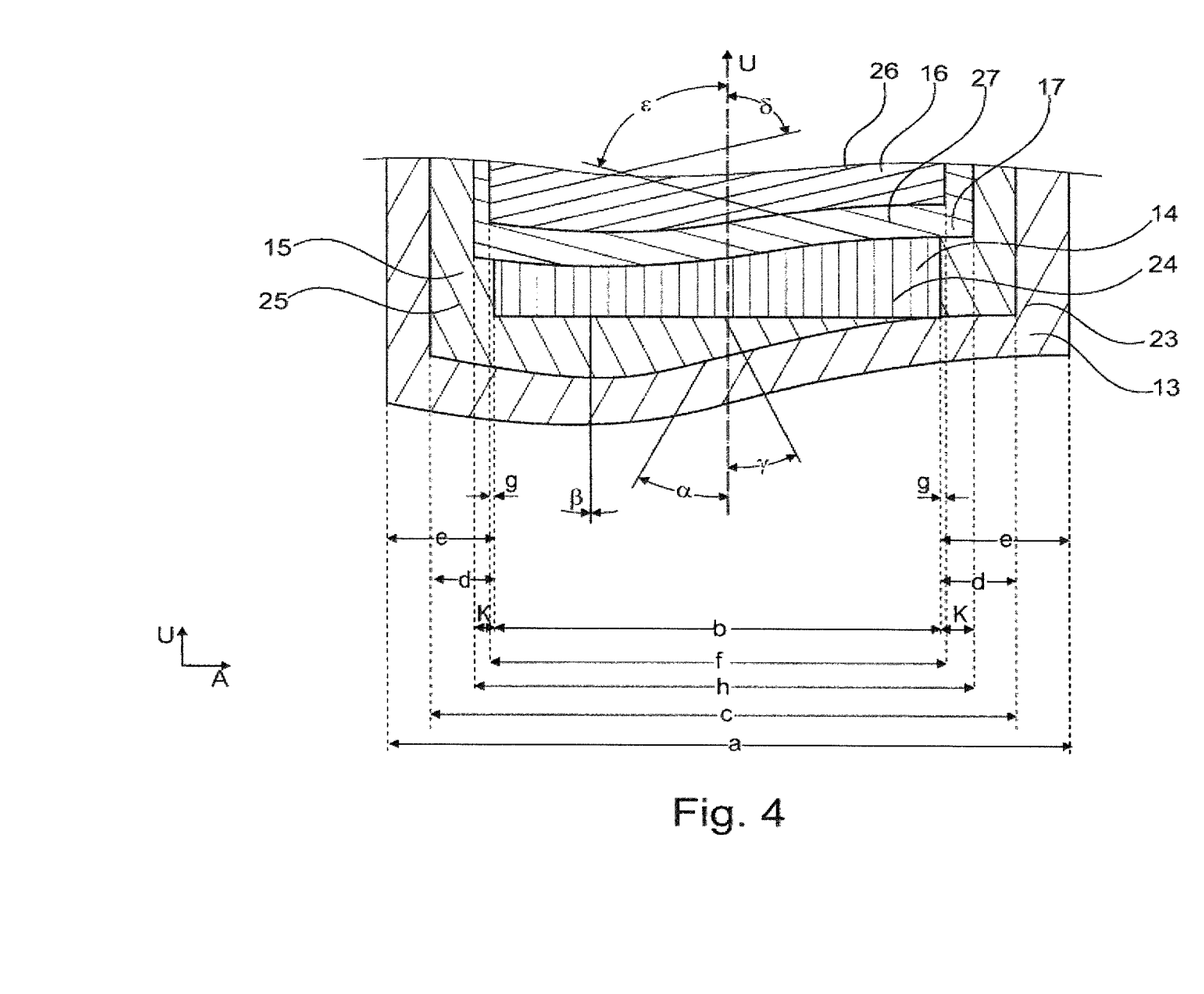

FIG. 3 and FIG. 4 show a further alternative embodiment in which, in addition to the belt plies 13, 15, 14 and 17 illustrated in FIG. 1 and FIG. 2, the belt 9 is formed with an additional, fifth belt ply 16 on the radially outer side of the fourth belt ply 17, which fifth belt ply extends in the circumferential direction U over the entire circumference of the pneumatic vehicle tire and in the axial direction A of the pneumatic vehicle tire from the left-hand tire shoulder to the right-hand tire shoulder. The belt ply 16 is formed from a ply of filiform parallel reinforcement members 26 which are embedded in rubber and which extend substantially rectilinearly over the entire axial width (f) of the belt ply 16 and which enclose an angle of inclination $\delta$ with respect to the circumferential direction U, where 40°≤$\delta$≤75°, for example where $\delta$=50°. The belt ply 16 extends, over its entire axial extent, in direct contact with the belt ply 17, and ends in the axial direction A with its two belt ply edges in each case at an axial position between the axial position of the closest belt ply edge of the third belt ply 14 and the axial position of the closest belt ply edge of the second belt ply (radially outer working ply) 15, at an axial distance (g) from the belt ply edge of the third belt ply 14, where g<d. The width (f) is the dimension of the axial extent of the fifth belt ply 16, where b<f<c<a.

In a further embodiment illustrated in FIGS. 3 and 4, the embodiment is additionally selected to be such that the following apply: f<h and g<k.

The reinforcement members 26 of the fifth belt ply 16 are in each case oriented—as illustrated in FIG. 4—with an opposite axial direction of inclination, as viewed along the extent in the circumferential direction U of the tire, in relation to the reinforcement members 27 of the fourth belt ply 17.

The reinforcement members 26 are steel cords of known type, for example of "1+5" type, "3+6" type, "3+8" type or "3+9" type.

In the embodiments mentioned above in conjunction with the embodiments mentioned in FIGS. 1 to 4, the reinforcement members 27 and the reinforcement members 26 are steel cords. In another embodiment which is not illustrated, the reinforcement members 26 are hybrid cords of known type which are suitable for use in utility vehicle tires, in the case of which filaments or threads are produced from different materials, such as for example steel, polyamide, glass fiber, polyester or aramide. In another embodiment which is not illustrated, the reinforcement members 27 are hybrid cords of known type which are suitable for use in utility vehicle tires, in the case of which filaments or threads are produced from different materials, such as for example steel, polyamide, glass fiber, polyester or aramide.

In another embodiment which is not illustrated, the reinforcement members 23 and/or the reinforcement members 24 and/or reinforcement members 25 are also hybrid cords of known type which are suitable for use in utility vehicle tires, in the case of which filaments or threads are produced from different materials, such as for example steel, polyamide, glass fiber, polyester or aramide.

It is understood that the foregoing description is that of the preferred embodiments of the invention and that various changes and modifications may be made thereto without departing from the spirit and scope of the invention as defined in the appended claims.

LIST OF REFERENCE NUMERALS

Part of the Description

1 Bead region
2 Side wall
3 Crown region
4 Bead core
5 Carcass
6 Apex (bead filler)
7 Carcass turn-over
8 Bead reinforcing strip
9 Belt
10 Profiled tread
11 Side wall rubber strip
12 Inner layer
13 Belt ply (working ply)
14 Belt ply (zero-degree ply)
15 Belt ply (working ply)
16 Belt ply
17 Belt ply
23 Reinforcement member
24 Reinforcement member
25 Reinforcement member
26 Reinforcement member
27 Reinforcement member

What is claimed is:

1. A pneumatic vehicle tire for utility vehicles, the pneumatic vehicle tire defining a circumferential direction (U) and a radial direction (R), the pneumatic vehicle tire comprising:

first and second side walls and a crown region disposed between said side walls;
a carcass;
five belt plies arranged resting one on top the other radially inward to radially outward and said plurality of belt plies conjointly defining a tire belt configured radially outside said carcass in said crown region;
each of said belt plies being formed as a one-part belt ply disposed between said side walls;
a profiled tread constructed radially outside said belt and built up on said belt;
said five belt plies including a first belt ply arranged furthest inwardly in the radial direction of said five belt plies;
said first belt ply having a plurality of parallel first reinforcement members embedded in rubber;
said five belt plies including a second belt ply arranged on said first belt ply, a third belt ply arranged on said second belt ply, a fourth belt ply arranged on said third belt ply and a fifth belt ply arranged outside of and on said fourth belt ply;
said second belt ply having a plurality of parallel second reinforcement members embedded in rubber;
said third belt ply having a plurality of parallel third reinforcement members embedded in rubber;
said fourth belt ply having a plurality of parallel fourth reinforcement members embedded in rubber;
said fifth belt ply having a plurality of parallel fifth reinforcement members;
said first belt ply and said second belt ply being configured as working plies;
said first reinforcement members each having an orientation which, together with the circumferential direction (U), encloses an angle $\alpha$ lying in a range of $10° \leq \alpha \leq 45°$;
said second reinforcement members each having an orientation which, together with the circumferential direction (U), encloses an angle $\gamma$ lying in a range of $10° \leq \gamma \leq 45°$;
said first reinforcement members having an opposite axial direction of inclination to said second reinforcement members as viewed in the circumferential direction U;
said fourth reinforcement members each having an orientation which, together with the circumferential direction (U), encloses an angle $\varepsilon$ lying in a range of $40° \leq \varepsilon \leq 75°$;
said third reinforcement members each having an orientation which, together with the circumferential direction (U), encloses an angle $\beta$ lying in a range of $0° \leq \beta \leq 5°$;
said fifth reinforcement members each having an orientation which, together with the circumferential direction (U), encloses an angle $\delta$ lying in a range of $40° \leq \delta \leq 75°$;
said fifth reinforcement members having an opposite axial direction of inclination to said fourth reinforcement members as viewed in the circumferential direction U;
said fourth belt ply having an axial extent (h); and,
said fifth belt ply having an axial extent (f) less than said axial extent (h) of said fourth belt ply.

2. The pneumatic vehicle tire of claim 1, wherein:
each of said five belt plies has a corresponding axial extent in the pneumatic vehicle tire; and,
said axial extent in the pneumatic vehicle tire of said first belt ply is greater than said axial extent of all other ones of said five belt plies.

3. A pneumatic vehicle tire for utility vehicles, the pneumatic vehicle tire defining a circumferential direction (U) and a radial direction (R), the pneumatic vehicle tire comprising:

first and second side walls and a crown region disposed between said side walls;
a carcass;
five belt plies arranged resting one on top the other radially inward to radially outward and said plurality of belt plies conjointly defining a tire belt configured radially outside said carcass in said crown region;
each of said belt plies being formed as a one-part belt ply disposed between said side walls;
a profiled tread constructed radially outside said belt and built up on said belt;
said five belt plies including a first belt ply arranged furthest inwardly in the radial direction of said five belt plies;
said first belt ply having a plurality of parallel first reinforcement members embedded in rubber;
said five belt plies including a second belt ply arranged on said first belt ply, a third belt ply arranged on said second belt ply, a fourth belt ply arranged on said third belt ply and a fifth belt ply arranged outside of and on said fourth belt ply;
said second belt ply having a plurality of parallel second reinforcement members embedded in rubber;
said third belt ply having a plurality of parallel third reinforcement members embedded in rubber;
said fourth belt ply having a plurality of parallel fourth reinforcement members embedded in rubber;
said fifth belt ply having a plurality of parallel fifth reinforcement members;
said first belt ply and said second belt ply being configured as working plies;

said first reinforcement members each having an orientation which, together with the circumferential direction (U), encloses an angle α lying in a range of 10°≤α≤45°;

said second reinforcement members each having an orientation which, together with the circumferential direction (U), encloses an angle γ lying in a range of 10°≤γ≤45°;

said first reinforcement members having an opposite axial direction of inclination to said second reinforcement members as viewed in the circumferential direction U;

said fourth reinforcement members each having an orientation which, together with the circumferential direction (U), encloses an angle ε lying in a range of 40°≤ε≤75°;

said third reinforcement members each having an orientation which, together with the circumferential direction (U), encloses an angle β lying in a range of 0°≤β≤5°;

each of said five belt plies having a corresponding axial extent in the pneumatic vehicle tire;

said third belt ply having a smaller axial extent in the pneumatic vehicle tire than said first belt ply and said second belt ply;

said fifth reinforcement members each having an orientation which, together with the circumferential direction (U), encloses an angle δ lying in a range of 40°≤δ≤75°;

said fifth reinforcement members having an opposite axial direction of inclination to said fourth reinforcement members as viewed in the circumferential direction U;

said fourth belt ply having an axial extent (h); and, said fifth belt ply having an axial extent (f) less than said axial extent (h) of said fourth belt ply.

4. The pneumatic vehicle tire of claim 1, wherein said fifth reinforcement members each have an orientation which, together with the circumferential direction (U), encloses an angle δ of 50°.

5. The pneumatic vehicle tire of claim 1, wherein said first reinforcement members and said second reinforcement members are steel cords.

6. The pneumatic vehicle tire of claim 1, wherein:
said first reinforcement members and said second reinforcement members each have a corresponding breaking force; and,
said first reinforcement members and said second reinforcement members are configured to have an extensibility D of D≥0.2% at 10% of said corresponding breaking force.

7. The pneumatic vehicle tire of claim 1, wherein said third reinforcement members are made of steel.

8. The pneumatic vehicle tire of claim 1, wherein said third reinforcement members are steel cords having a breaking force, said third reinforcement members further having an extensibility D of D≥0.2% at 10% of said breaking force.

9. The pneumatic vehicle tire of claim 1, wherein said third reinforcement members are steel cords having a breaking force, said third reinforcement members further having an extensibility D of D≥1% at 10% of said breaking force.

10. The pneumatic vehicle tire of claim 1, wherein said fourth reinforcement members are steel cords.

11. The pneumatic vehicle tire of claim 1, wherein said fifth reinforcement members are steel cords.

12. The pneumatic vehicle tire of claim 1, wherein said first reinforcement members and said fourth reinforcement members, as viewed in the circumferential direction U, have identical axial directions of inclination.

13. The pneumatic vehicle tire of claim 1, wherein said second reinforcement members and said fourth reinforcement members, as viewed in the circumferential direction U, have identical axial directions of inclination.

14. A pneumatic vehicle tire for utility vehicles, the pneumatic vehicle tire defining a circumferential direction (U) and a radial direction (R), the pneumatic vehicle tire comprising:

a carcass;

at least four belt plies arranged resting one on top the other radially inward to radially outward and said plurality of belt plies conjointly defining a tire belt configured radially outside said carcass;

a profiled tread constructed radially outside said belt and built up on said belt;

said at least four belt plies including a first belt ply arranged furthest inwardly in the radial direction of said at least four belt plies;

said first belt ply having a plurality of parallel first reinforcement members embedded in rubber;

said at least four belt plies including a second belt ply arranged on said first belt ply, a third belt ply arranged on said second belt ply and a fourth belt ply arranged on said third belt ply;

said second belt ply having a plurality of parallel second reinforcement members embedded in rubber;

said third belt ply having a plurality of parallel third reinforcement members embedded in rubber;

said fourth belt ply having a plurality of parallel fourth reinforcement members embedded in rubber;

said first belt ply and said second belt ply being configured as working plies;

said first reinforcement members each having an orientation which, together with the circumferential direction (U), encloses an angle α lying in a range of 10°≤α≤45°;

said second reinforcement members each having an orientation which, together with the circumferential direction (U), encloses an angle γ lying in a range of 10°≤γ≤45°;

said first reinforcement members having an opposite axial direction of inclination to said second reinforcement members as viewed in the circumferential direction U;

said fourth reinforcement members each having an orientation which, together with the circumferential direction (U), encloses an angle ε lying in a range of 40°≤ε≤75°;

said third reinforcement members each having an orientation which, together with the circumferential direction (U), encloses an angle β lying in a range of 0°≤β≤5°;

a fifth belt ply arranged outside of and on said fourth belt ply;

said fifth belt ply having a plurality of parallel fifth reinforcement members;

said fifth reinforcement members each having an orientation which, together with the circumferential direction (U), encloses an angle δ lying in a range of 40°≤δ≤75°;

said fifth reinforcement members having an opposite axial direction of inclination to said fourth reinforcement members as viewed in the circumferential direction U;

said first belt ply having a first axial extent in the pneumatic vehicle tire;

said second belt ply having a second axial extent in the pneumatic vehicle tire;

said fourth belt ply having a fourth axial extent in the pneumatic vehicle tire;
said fifth belt ply having a fifth axial extent in the pneumatic vehicle tire; and,
said fourth axial extent and said fifth axial extent being smaller than said first axial extent and said second axial extent.

* * * * *

UNITED STATES PATENT AND TRADEMARK OFFICE
CERTIFICATE OF CORRECTION

PATENT NO. : 10,214,053 B2
APPLICATION NO. : 15/186864
DATED : February 26, 2019
INVENTOR(S) : M. Lacko et al.

Page 1 of 1

It is certified that error appears in the above-identified patent and that said Letters Patent is hereby corrected as shown below:

In the Specification

<u>In Column 6</u>:
Line 29: delete "$0° \leq \beta \leq 45°$" and substitute -- $0° \leq \beta \leq 5°$ -- therefor.

<u>In Column 7</u>:
Line 59: delete "3×7 HENT" and substitute -- 3×7 HEHT -- therefor.

Signed and Sealed this
Twenty-fifth Day of June, 2019

Andrei Iancu
*Director of the United States Patent and Trademark Office*